(12) United States Patent
Yang et al.

(10) Patent No.: US 9,219,312 B2
(45) Date of Patent: Dec. 22, 2015

(54) FEED HORN SEALING STRUCTURE AND METHOD OF SEALING THE FEED HORN

(71) Applicants: Daming Yang, Dunwoody, GA (US); Yiguang Yang, Dunwoody, GA (US)

(72) Inventors: Daming Yang, Dunwoody, GA (US); Yiguang Yang, Dunwoody, GA (US)

(73) Assignees: Daming Yang, Dunwoody, GA (US); Yiguang Yang, Dunwoody, GA (US)

( * ) Notice: Subject to any disclaimer, the term of this patent is extended or adjusted under 35 U.S.C. 154(b) by 28 days.

(21) Appl. No.: 14/246,130

(22) Filed: Apr. 6, 2014

(65) Prior Publication Data

US 2015/0288070 A1  Oct. 8, 2015

(51) Int. Cl.
*H01Q 13/00* (2006.01)
*H01Q 13/02* (2006.01)
*F16J 15/00* (2006.01)
*H01Q 1/40* (2006.01)

(52) U.S. Cl.
CPC ........... *H01Q 13/0208* (2013.01); *F16J 15/002* (2013.01); *H01Q 1/40* (2013.01); *H01Q 13/0291* (2013.01)

(58) Field of Classification Search
CPC ...... F16J 15/002; H01Q 13/0291; H01Q 1/40
USPC .......................................... 343/786, 772, 872
See application file for complete search history.

(56) References Cited

U.S. PATENT DOCUMENTS

| | | | |
|---|---|---|---|
| 7,948,442 B2 * | 5/2011 | Hatazawa | H01P 1/042 343/756 |
| 2005/0001776 A1 * | 1/2005 | Nagano | H01Q 1/247 343/786 |
| 2005/0017916 A1 * | 1/2005 | Lewry | H01Q 1/528 343/786 |

* cited by examiner

*Primary Examiner* — Hoanganh Le (57) ABSTRACT

A feed horn assembly includes a tubular horn body, a film and a sealing structure. The tubular horn body has a first end and an opposite, second end. The first end includes a peripheral groove defined by an inner peripheral portion and an outer peripheral portion. The film covers the first end. A peripheral bending portion and a periphery portion of the film are disposed inside the groove. The sealing structure is disposed in the groove, and includes a first sealing component urging against the peripheral bending portion and the periphery portion of the film, and a second sealing component urging against the peripheral bending portion and the first sealing component. The outer peripheral portion has a peripheral chamfer portion formed by crimping. The peripheral chamfer portion urges against the sealing structure, such that a sealed condition is formed between the film and the inner peripheral wall.

20 Claims, 10 Drawing Sheets

FEED HORN SEALING STRUCTURE AND METHOD OF SEALING THE FEED HORN

CROSS-REFERENCE

Some references, which may include patents, patent applications and various publications, are cited and discussed in the description of this disclosure, which includes, among other things, exhibits and drawings, if any. The citation and/or discussion of such references is provided merely to clarify the description of the disclosure and is not an admission that any such reference is "prior art" to the disclosure described herein. All references cited and discussed in this specification are incorporated herein by reference in their entireties and to the same extent as if each reference was individually incorporated by reference.

FIELD OF THE INVENTION

The disclosure relates generally to a feed horn for dish antenna, and more specifically related to a feed horn with a long lasting, securely sealed window.

BACKGROUND OF THE INVENTION

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the disclosure.

Dish antenna is widely used for receiving TV signals. A feed horn assembly is often used in the dish antenna for receiving signals. The feed horn is covered by a securely sealed window, to prevent rain, water or other debris from entering the hollow horn body, while maintaining good signal transmission through the window. Further, a coating may be added to the sealed window. The window can be fixed to the feed horn by an adhesive. However, window sealed by the adhesive may not have satisfied sealing effect after long time use, and the coating on the window may easily be scratched.

Therefore, a heretofore unaddressed need exists in the arts to address the aforementioned deficiencies and inadequacies.

SUMMARY OF THE DISCLOSURE

Further areas of applicability of the disclosure will become apparent from the detailed description provided hereinafter. It should be understood that the detailed description and specific examples are intended for purposes of illustration only and are not intended to limit the scope of the disclosure.

In one aspect, the present invention is directed to a feed horn assembly. In one embodiment, the feed horn assembly includes a tubular horn body, a film, and a sealing structure. The tubular horn body has a first end and an opposite, second end. The first end includes a peripheral groove defined by an inner peripheral portion and an outer peripheral portion. The film covers the first end of the tubular horn body. A peripheral bending portion and a periphery portion of the film are disposed inside the groove and in contact with an inner side surface and a bottom surface of the peripheral groove respectively. The sealing structure is disposed in the groove. The sealing structure includes a first sealing component urging against the peripheral bending portion and the periphery portion of the film, and a second sealing component urging against the peripheral bending portion and the first sealing component. The outer peripheral portion has a peripheral chamfer portion formed by crimping. The peripheral chamfer portion urges against the sealing structure, such that a sealed condition is formed between the film and the inner peripheral wall.

In one embodiment, the tubular horn body is made of metal, plastic, or glass fiber.

In one embodiment, an opening of the first end of the tubular horn body is in a shape of circle or ellipse.

In one embodiment, the film is hydrophobic, water proof, and has anti-UV properties.

In one embodiment, the film is formed by a plastic material and a UV absorber.

In one embodiment, the film is formed by about 89% of polypropylene, about 1% UV absorber, and about 10% ethylene vinyl acetate.

In one embodiment, the UV absorber is benziohenone or benzotriazole. In one embodiment, the UV absorber is UV 326 (enzotriazole UV Absorber).

In one embodiment, the first sealing component is an O-ring.

In one embodiment, the second sealing component is a plastic ring.

In one embodiment, each of the first sealing component and the second sealing component has a size and shape substantially consistent with a size and shape of the peripheral groove, such that the first sealing component and the second sealing component can be installed in the peripheral groove.

In one embodiment, each of the peripheral groove, the first sealing component and the second sealing component has a diameter of about 1.6-2.0 inch.

In one embodiment, the first sealing component is an O-ring, the second sealing component is a plastic ring, an inner diameter of the second sealing component is greater than an inner diameter of the first sealing component, and an outer diameter of the second sealing component is smaller than an outer diameter of the first sealing component.

In another aspect, the present invention is directed to a method of producing a feed horn assembly. In one embodiment, the method includes:

providing a tubular horn body having a first end and an opposite, second end, wherein the first end comprises a peripheral groove defined by an inner peripheral portion and an outer peripheral portion of the tubular horn body;

placing a film on the first end of the horn body, wherein the film comprises a central portion, a peripheral bending portion and a periphery portion, and the peripheral bending portion and the peripheral portion are disposed in the peripheral groove and in contact with an inner side surface and a bottom surface of the groove;

disposing a sealing structure in the peripheral groove, wherein the sealing structure comprises a first sealing component contacting the peripheral bending portion, the periphery portion, and a second sealing component contacting the peripheral bending portion and the first sealing component;

fixing the film and the sealing structure; and crimping the outer peripheral portion to form a peripheral chamfer portion, wherein the peripheral chamfer portion urges against the sealing structure, such that a sealed condition is formed between the film and the inner peripheral portion.

In one embodiment, the crimping is performed by a crimping assembly, and the crimping assembly includes a shaft and a shaft plate connected with the shaft, three arms, three wheels and a table. The three arms are connected with the shaft plate. Each arm has a straight portion, a bending portion extending downwards from the straight portion, and a gap formed in an end of the bending portion. Each wheel is installed in one of the three gaps. The table is used for fixing the feed horn assembly thereon. The three wheels are configured to crimping the outer peripheral portion of the horn body, such that the sealed condition is formed between the film and the inner peripheral portion.

In one embodiment, a rotation speed of the shaft is about 300 revolutions per minute.

In one embodiment, a pressing force of the crimping assembly to the feed horn assembly is about 10 kilograms.

In one embodiment, the peripheral chamfer portion is formed at top of outer surface of the outer peripheral portion.

In one embodiment, the film is formed by a plastic material, an anti-UV material, and a hydrophobic material.

In one embodiment, the film is formed by about 89% of polypropylene, about 1% anti UV material, and about 10% ethylene vinyl acetate.

In one embodiment, each of the first sealing component and the second sealing component has a size and shape substantially consistent with a size and shape of the peripheral groove, such that the first sealing component and the second sealing component can be installed in the peripheral groove.

In one embodiment, each of the peripheral groove, the first sealing component and the second sealing component has a diameter of about 1.6-2.0 inch.

In one embodiment, the first sealing component is an O-ring, the second sealing component is a plastic ring, an inner diameter of the second sealing component is greater than an inner diameter of the first sealing component, and an outer diameter of the second sealing component is smaller than an outer diameter of the first sealing component.

BRIEF DESCRIPTION OF THE DRAWINGS

The following figures form part of the present specification and are included to further demonstrate certain aspects of the disclosure. The disclosure may be better understood by reference to one or more of these figures in combination with the detailed description of specific embodiments presented herein. The drawings described below are for illustration purposes only. The drawings are not intended to limit the scope of the present teachings in any way.

DETAILED DESCRIPTION OF THE INVENTION

The disclosure will now be described more fully hereinafter with reference to the accompanying drawings, in which exemplary embodiments of the disclosure are shown. This invention may, however, be embodied in many different forms and should not be construed as limited to the embodiments set forth herein. Rather, these embodiments are provided so that this disclosure will be thorough and complete, and will fully convey the scope of the disclosure to those skilled in the art. Like reference numerals refer to like elements throughout.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting and/or capital letters has no influence on the scope and meaning of a term; the scope and meaning of a term are the same, in the same context, whether or not it is highlighted and/or in capital letters. It will be appreciated that the same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only and in no way limits the scope and meaning of the disclosure or of any exemplified term. Likewise, the disclosure is not limited to various embodiments given in this specification.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below can be termed a second element, component, region, layer or section without departing from the teachings of the disclosure.

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" to another feature may have portions that overlap or underlie the adjacent feature.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification specify the presence of stated features, regions, integers, steps, operations, elements, and/or components, but do not preclude the presence or addition of one or more other features, regions, integers, steps, operations, elements, components, and/or groups thereof Furthermore, relative terms, such as "lower" or "bottom" and "upper" or "top", may be used herein to describe one element's relationship to another element as illustrated in the figures. It will be understood that relative terms are intended to encompass different orientations of the device in addition to the orientation shown in the figures. For example, if the device in one of the figures is turned over, elements described as being on the "lower" side of other elements would then be oriented on the "upper" sides of the other elements. The exemplary term "lower" can, therefore, encompass both an orientation of lower and upper, depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

As used herein, "around", "about", "substantially" or "approximately" shall generally mean within 20 percent, preferably within 10 percent, and more preferably within 5 percent of a given value or range. Numerical quantities given herein are approximate, meaning that the terms "around", "about", "substantially" or "approximately" can be inferred if not expressly stated.

As used herein, the terms "comprise" or "comprising", "include" or "including", "carry" or "carrying", "has/have" or "having", "contain" or "containing", "involve" or "involving" and the like are to be understood to be open-ended, i.e., to mean including but not limited to.

The description will be made as to the embodiments of the disclosure in conjunction with the accompanying drawings. In accordance with the purposes of this invention, as embodied and broadly described herein, this invention, in one aspect, relates to a device for testing a biological sample.

Figure 1:
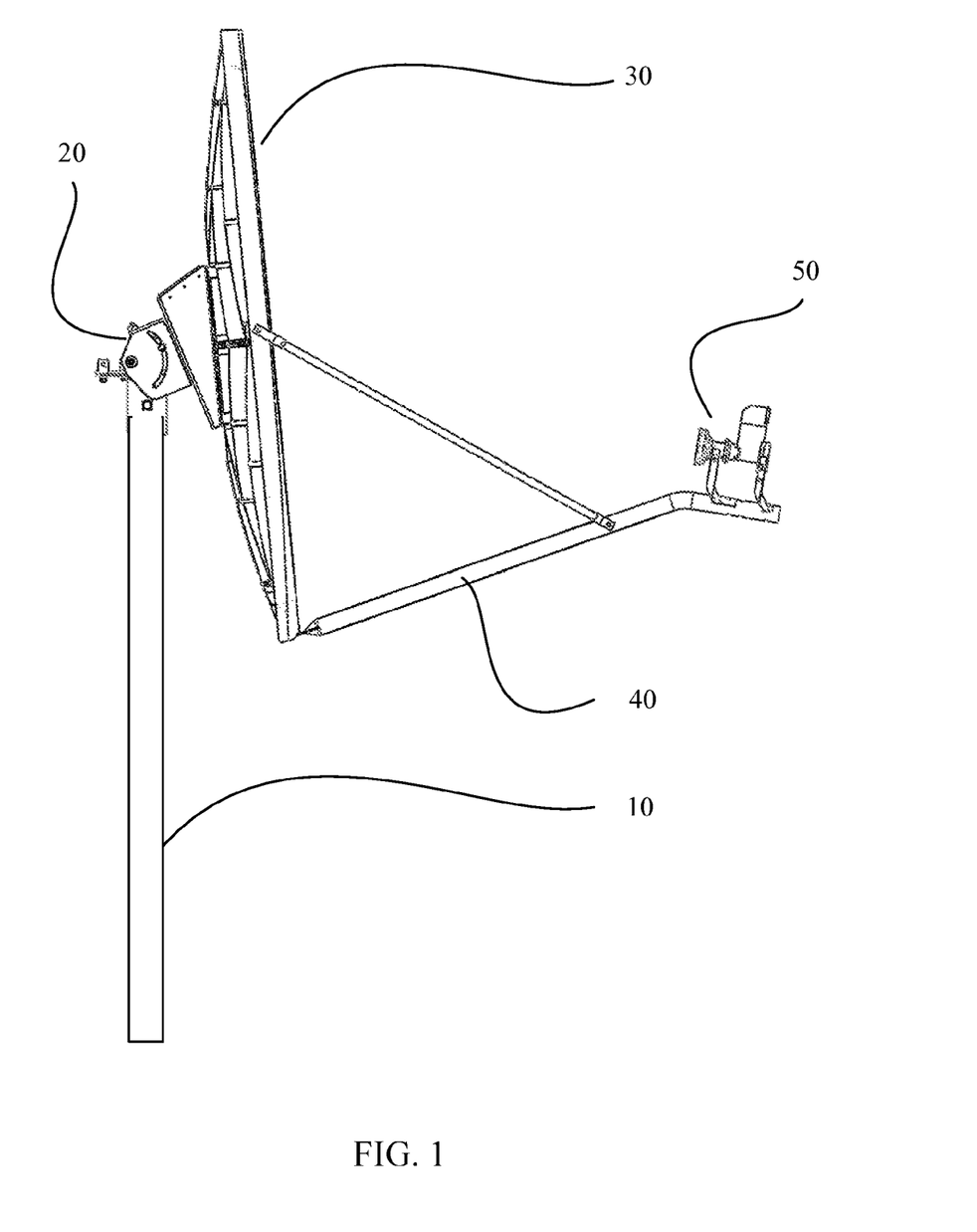
FIG. 1 is a schematic three dimensional view of a disk antenna assembly according to one embodiment of the present invention.

As shown in FIG. 1, in certain embodiments, an antenna system includes a pipe 10, a mount 20, a reflector 30, a feed support structure 40, and a feed horn assembly 50. The pipe 10 is used to support the antenna system. A lower end of the pipe 10 can be fixed in the earth or a building structure, and the mount 20 is fixed on an upper end of the pipe 10. In certain embodiments, the system does not include a pipe 10 and the mount 20 is fixed directly onto a structure in the building, for example, on the roof of a house. The mount 20 is connected with the reflector 30. In certain embodiments, the mount 20 has an adjustment mechanism to adjust the position of the reflector 30. The adjustment mechanism of the mount 20 can include two independent adjustment dimensions to locate an optimal facing direction of the reflector for obtaining one or more target signals. The feed support structure 40 may include a feed support and feed rods. One end of the feed support is fixed to the reflector 30, and the other end of the feed support has a supporting portion for the feed horn assembly 50 to be placed thereon. In certain embodiments, two symmetrically disposed feed rods are disposed to further stabilize and fix the feed support. One end of each feed rods is fixed to one side of the reflector 30, and the other end of each feed rods is fixed adjacent to the support portion of the feed support.

Figure 2:
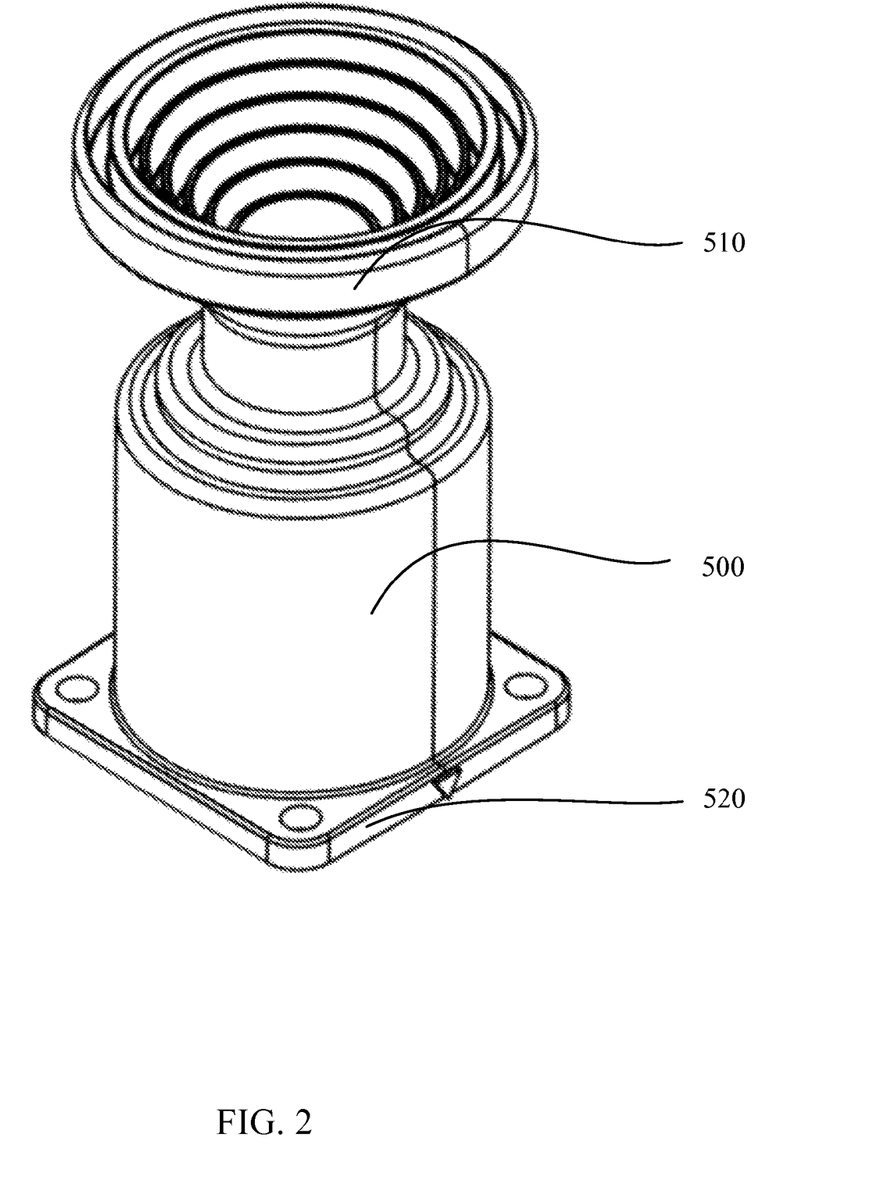
FIG. 2 is a schematic three dimensional view of a feed horn body according to one embodiment of the present invention.

FIG. 2 is a schematic three dimensional view of a horn body 500 of the feed horn assembly 50. The horn body 500 includes a first end 510 and a second end 520 opposite to the first end 510. The first end 510 is fixed to the support portion of the feed support structure 40.

Figure 3:
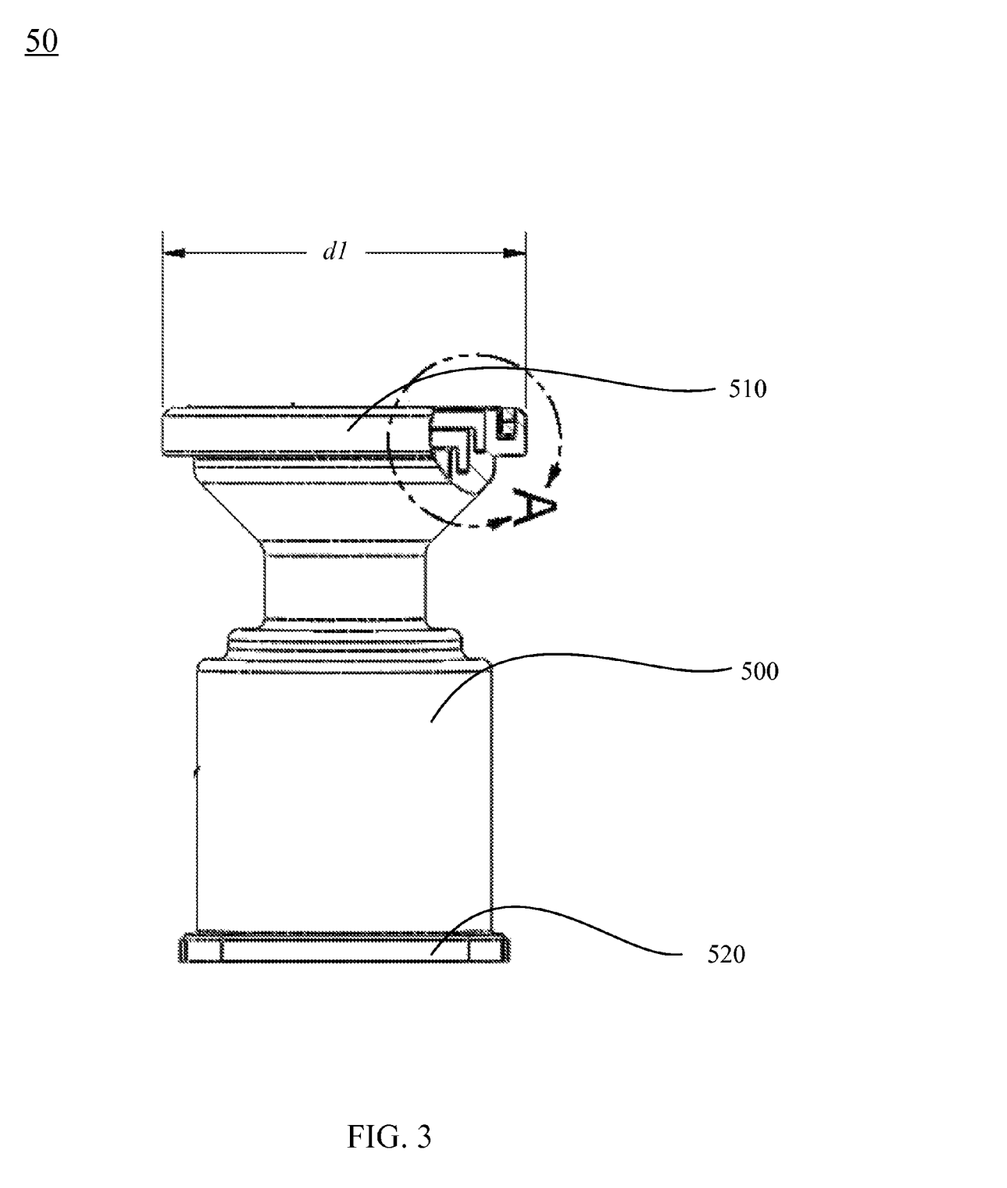
FIG. 3 is a schematic side view of a feed horn assembly according to one embodiment of the present invention.
Figure 4:
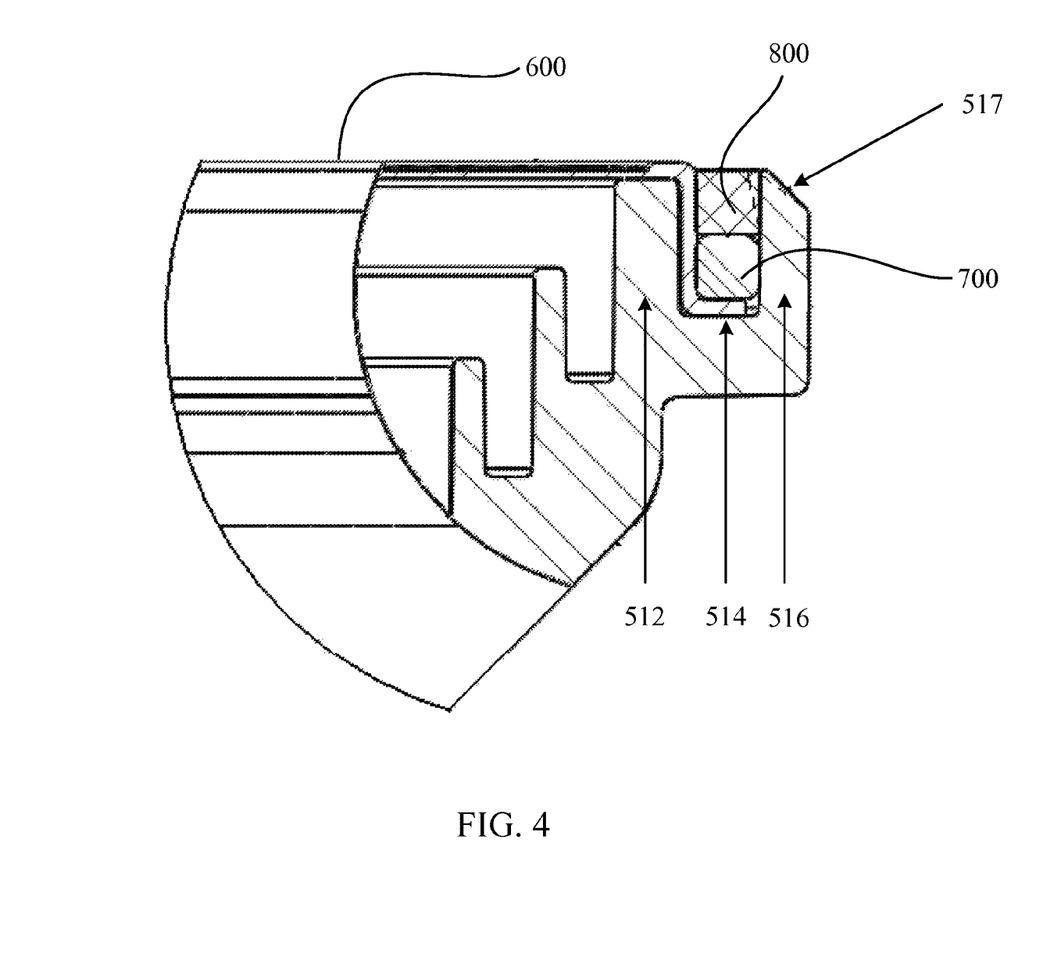
FIG. 4 is an enlarged sectional view of part A of FIG. 3 according to one embodiment of the present invention.

FIG. 3 and FIG. 4 are schematic side view and enlarged view of the feed horn assembly 50. The feed horn assembly 50 includes the tubular horn body 500, a film or a sealing window 600, a first sealing component 700, and a second sealing component 800.

As shown in FIGS. 2-5, the first end 510 of the horn body 500 includes an inner peripheral portion 512 and an outer peripheral portion 516, and a peripheral groove 514 is defined by the inner peripheral portion 512 and the outer peripheral portion 516.

Figure 5:
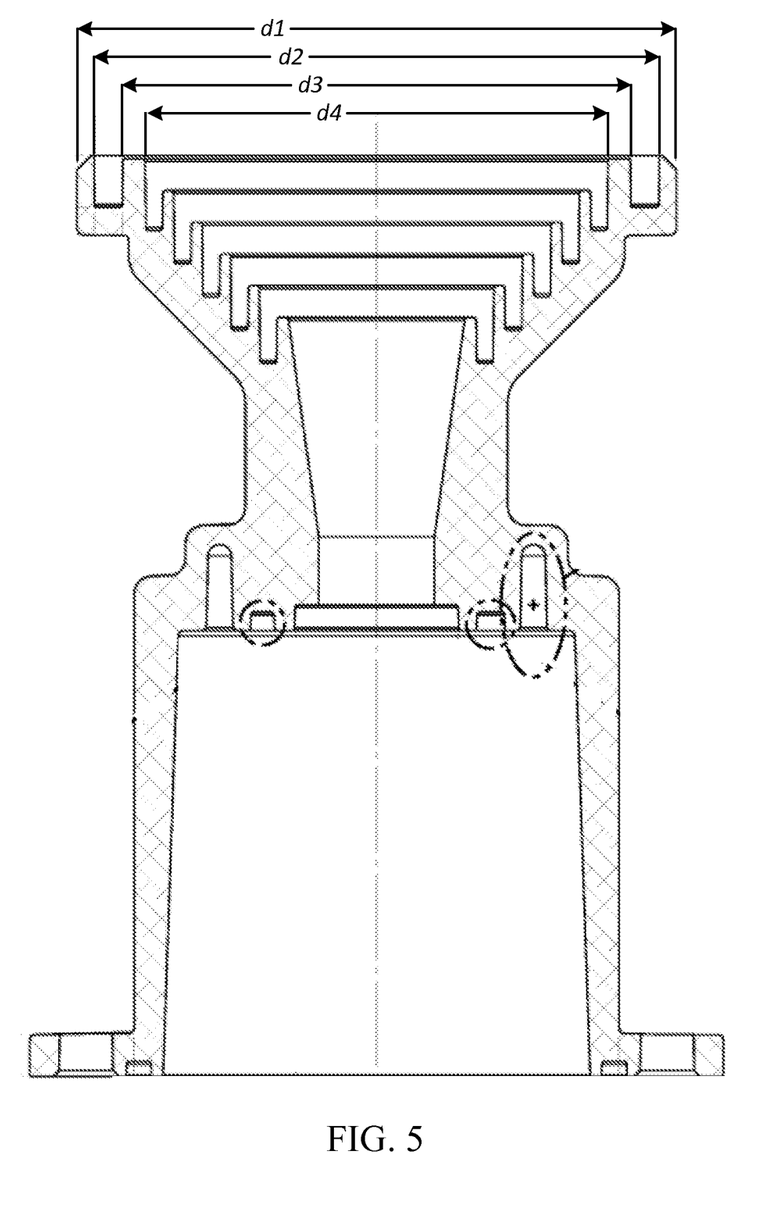
FIG. 5 is a side sectional view of a feed horn body according to one embodiment of the present invention.

In certain embodiments, the first end 510, the inner peripheral portion 512, the peripheral groove 514 and the outer peripheral portion 516 are in a shape of cylinder and a sectional view from the top of the horn body 500 is in a shape of circle or ellipse.

In certain embodiments, sectional views the first end 510, the inner peripheral portion 512, the peripheral groove 514 and the outer peripheral portion 516 are in a shape of circle.

In these embodiments, as shown in FIG. 5, the first end 510 of the horn body 500 has a diameter d1. The outer peripheral portion 516 has an outer side diameter (that is, d1) and an inner side diameter d2. The groove 514 is defined by an outer side diameter (that is, d2) and an inner side diameter d3. The inner peripheral portion 514 has an outer side diameter (that is, d3) and an inner side diameter d4.

In certain embodiments, the diameter d1 is in the range of about 0.21-22 inch. In certain embodiments, the diameter d1 is in the range of about 0.45-11 inch. In certain embodiments, the diameter d1 is in the range of about 1.1-4.2 inch. In certain embodiments, the diameter d1 is about 2.100 (±0.002) inch.

In certain embodiments, the diameter d2 is in the range of about 0.20-20 inch. In certain embodiments, the diameter d2 is in the range of about 0.40-10 inch. In certain embodiments, the diameter d2 is in the range of about 1.0-4.0 inch. In certain embodiments, the diameter d2 is about 1.979 (±0.002) inch.

In certain embodiments, the diameter d3 is in the range of about 0.18-18 inch. In certain embodiments, the diameter d3 is in the range of about 0.36-9 inch. In certain embodiments, the diameter d3 is in the range of about 0.9-3.6 inch. In certain embodiments, the diameter d3 is about 1.781 (±0.002) inch.

In certain embodiments, the diameter d4 is in the range of about 0.16-16 inch. In certain embodiments, the diameter d4 is in the range of about 0.32-8 inch. In certain embodiments, the diameter d4 is in the range of about 0.8-3.2 inch. In certain embodiments, the diameter d4 is about 1.618 (±0.002) inch.

The outer peripheral portion 516 has a peripheral chamfer portion 517, and the peripheral chamfer portion 517 is formed by crimping. The peripheral chamfer portion 517 urges against the sealing structure, such that a sealed condition is formed between the film 600 and the inner peripheral portion 512.

In certain embodiments, as shown in FIG. 4 in the sectional view, the length of the peripheral chamfer portion 517 is in the range of about 0.005-0.5 inch. In certain embodiments, the length of the peripheral chamfer portion 517 is in the range of about 0.01-0.25 inch. In certain embodiments, the length of the peripheral chamfer portion 517 is in the range of about 0.025-0.1 inch. In certain embodiments, the length of the peripheral chamfer portion 517 is about 0.05 inch.

In certain embodiments, as shown in FIG. 4 in the sectional view, the peripheral chamfer portion 517 forms an acute angle with the inner surface of the outer peripheral portion 516. In certain embodiments, the acute angel between the peripheral chamfer portion 517 and the outer peripheral portion 516 is in the range of about 20-80°. In certain embodiments, the acute angel between the peripheral chamfer portion 517 and the outer peripheral portion 516 is in the range of about 30-60°. In certain embodiments, the acute angel between the peripheral chamfer portion 517 and the outer peripheral portion 516 is in the range of about 40-50°. In certain embodiments, the acute angel between the peripheral chamfer portion 517 and the outer peripheral portion 516 is in the range of about 45°.

In certain embodiments, the peripheral chamfer portion 517 is formed by crimping, and the inner surface of the outer peripheral portion 516 is slightly slant inwards to urge against the first sealing component 700 and the second sealing component 800, which subsequently urge the sealing film 600, such that a tight sealing is formed between the sealing film 600 and the inner peripheral portion 512.

Figure 6A:
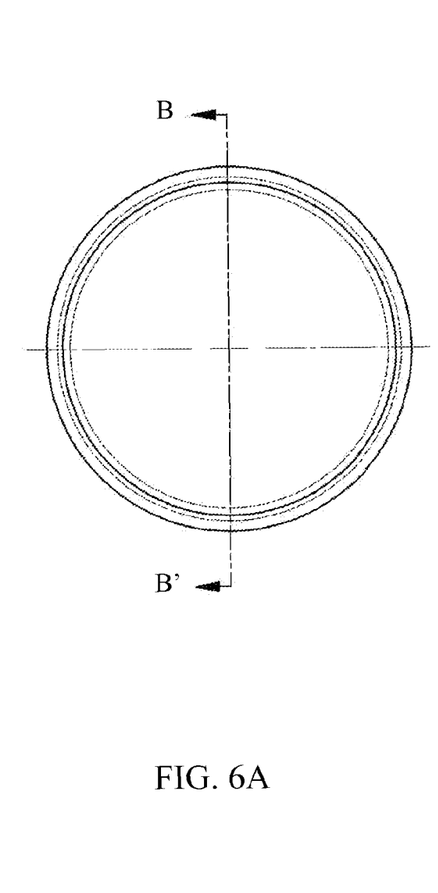
FIG. 6A is a top view of a film of a feed horn assembly according to one embodiment of the present invention.
Figure 6B:
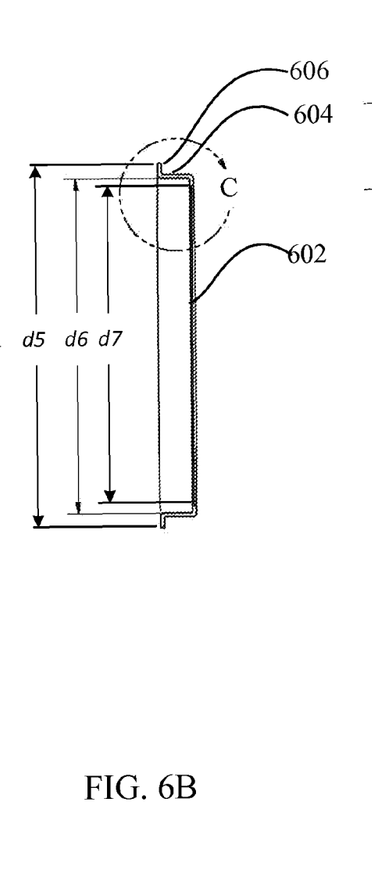
FIG. 6B is a side view of the film of FIG. 6A along B-B'.
Figure 6C:
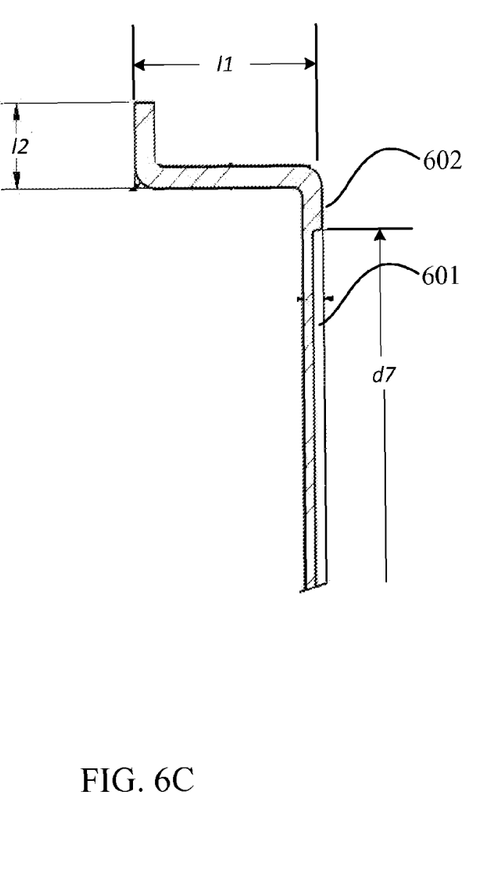
FIG. 6C is an enlarged view of par C of FIG. 6B.

In certain embodiments, the film 600 covers an opening of the first end 510 of the tubular horn body 500. As shown in FIGS. 6A-6C, the film 600 includes a central portion 602, a peripheral bending portion 604 bends downwards from the circumference of the central portion 602, and a periphery portion 606 bends upwards from the circumference of the peripheral bending portion 604. When being covered on the horn body, the central portion 602 covers the opening of the first end 510 of the horn body 500, the peripheral bending portion 604 is placed immediately surrounding the outer side surface of the inner peripheral portion 512 and located in the peripheral groove 514, and the peripheral portion 606 is placed along the bottom surface of the peripheral grove 514.

Referring to FIGS. 6A-6C, in certain embodiments, the central portion 602, the peripheral bending portion 604, and the periphery portion 606 have the same thickness. In certain embodiments, the thickness of the film 600 is in the range of about 0.002-0.20 inch. In certain embodiments, the thickness of the film 600 is in the range of about 0.004-0.10 inch. In certain embodiments, the thickness of the film 600 is in the range of about 0.01-0.04 inch. In certain embodiments, the thickness of the film 600 is about 0.020±0.005 inch.

In certain embodiments, the central portion 602, the peripheral bending portion 604, and the periphery portion 606 are in the shape of a circle or an ellipse when view from the top.

As shown in FIG. 6A, the central portion 602, the peripheral bending portion 604, and the periphery portion 606 are in the shape of a circle when view from the top.

In certain embodiments, the film 600 has a circular shape and the diameter of the circle is d5. In certain embodiments, the diameter d5 is in the range of about 0.19-19 inch. In certain embodiments, the diameter d5 is in the range of about 0.39-9.7 inch. In certain embodiments, the diameter d5 is in the range of about 0.97-3.90 inch. In certain embodiments, the diameter d5 is about 1.945±0.005 inch.

In certain embodiments, the central portion 602 has a circular shape and the diameter of the circle is d6. In certain embodiments, the diameter d6 is in the range of about 0.18-18 inch. In certain embodiments, the diameter d6 is in the range of about 0.36-8.9 inch. In certain embodiments, the diameter d6 is in the range of about 0.90-3.6 inch. In certain embodiments, the diameter d6 is about 1.785+(0.000-0.005) inch.

In certain embodiments, the central portion 602 may include a depressed portion 601 in the center of the central portion 602, such that the transmission of signals through the central portion 601 of the film 600 is improved. In certain embodiments, the depressed portion 601 has a circular shape and the diameter of the circle is d7. In certain embodiments, the diameter d7 of the depressed portion 601 is in the range of about 0.17-17 inch. In certain embodiments, the diameter d7 is in the range of about 0.37-8.5 inch. In certain embodiments, the diameter d7 is in the range of about 0.85-3.4 inch. In certain embodiments, the diameter d7 is about 1.705±0.005 inch.

In certain embodiments, the thickness of the depressed portion 601 is in the range of about 0.001-0.1 inch. In certain embodiments, the thickness of the depressed portion 601 is in the range of about 0.002-0.05 inch. In certain embodiments, the thickness of the depressed portion 601 is in the range of about 0.005-0.02. In certain embodiments, the thickness of the depressed portion 6022 is about 0.01 (−0.001/+0.003) inch. In certain embodiments, the thickness of the depressed portion 601 is half the thickness of the other portions of the film 600.

The peripheral bending portion 604 extends downward from the central portion 602. Thus, the outer diameter of the bending portion 604 is the same as the diameter of the central portion 602. The bending portion 604 further has a depth or length l1 in a direction substantially perpendicular to the surface of the central portion 602. In certain embodiments, the peripheral bending portion 604 has a length l1 in the range of about 0.02-1.9 inch. In certain embodiments, the length l1 of the peripheral bending portion 604 is in the range of about 0.04-0.95 inch. In certain embodiments, the length l1 of the peripheral bending portion 604 is in the range of about 0.1-0.38 inch. In certain embodiments, the length l1 of the peripheral bending portion 604 is about 0.19±0.005 inch.

The peripheral bending portion 604 extends upwards to form from the peripheral portion 606. The diameter of the peripheral portion 606 is the same as the diameter of the film 600. The peripheral portion 606 further has a length l2 in a direction substantially parallel with the surface of the central portion 602. In certain embodiments, the peripheral portion 606 has a length l2 in the range of about 0.01-0.8 inch. In certain embodiments, the length l2 of the peripheral portion 606 is in the range of about 0.02-0.4 inch. In certain embodiments, the length l2 of the peripheral portion 606 is in the range of about 0.04-0.16 inch. In certain embodiments, the length l2 of the peripheral portion 606 is about 0.08±0.005 inch.

In certain embodiments, the film is hydrophobic, water proof, and has anti-UV properties.

In certain embodiments, the film is formed by a plastic material and a UV absorber.

In certain embodiments, the film is formed by about 89% of polypropylene (PP), about 1% UV absorber, and about 10% ethylene vinyl acetate (EVA).

In certain embodiments, the UV absorber is benziohenone or benzotriazole. In one embodiment, the UV absorber is UV 326 (enzotriazole UV Absorber).

In certain embodiments, the film 600 includes about 60-100% PP in weight percentage. In certain embodiments, the film 600 includes 79-99% PP in weight percentage. In certain embodiments, the film 600 includes 84-93% PP in weight percentage. In certain embodiments, the film 600 includes 89% PP in weight percentage.

In certain embodiments, the film 600 includes about 0.1-10% UV absorber in weight percentage. In certain embodiments, the film 600 includes 0.2-5% anti UV absorber in weight percentage. In certain embodiments, the film 600 includes 0.5-2% UV absorber al in weight percentage. In certain embodiments, the film 600 includes 1% UV absorber in weight percentage.

In certain embodiments, the film 600 includes about 1-30% EVA in weight percentage. In certain embodiments, the film 600 includes 2-20% EVA in weight percentage. In certain embodiments, the film 600 includes 5-15% EVA in weight percentage. In certain embodiments, the film 600 includes 10% EVA in weight percentage.

In certain embodiments, the film 600 includes 89% PP, 1% UV absorber and 10% EVA.

The sealing structure, including the first sealing component 700 and the second sealing component 800, is disposed in the peripheral groove 514. The first sealing component 700 urges against the outer surface of the peripheral groove 514, the peripheral bending portion 604, and the peripheral portion 606. A second sealing component 800 urges against the outer surface of the peripheral groove 514, the peripheral portion 606, and the first sealing element 700.

Figure 7A:
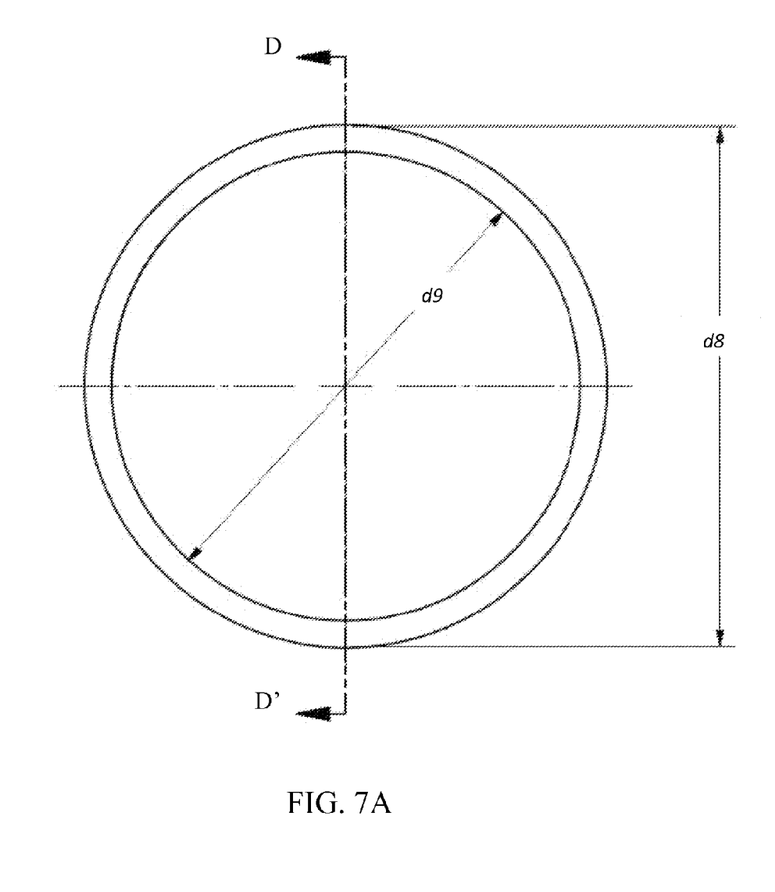
FIG. 7A is a top view of a first sealing component of the feed horn according to one embodiment of the present invention.
Figure 7B:
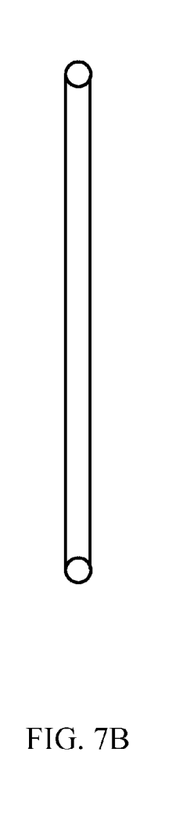
FIG. 7B is a side view of the first sealing component of FIG. 7A along D-D'.

As shown in FIG. 7A and FIG. 7B, the first sealing component 700 is a ring shaped structure matching the peripheral groove 514 and is disposed over and along the bottom of the peripheral groove 514. In certain embodiments, the peripheral groove 514 can be in a circular or an elliptical shape. In certain embodiments, the first sealing component 700 disposed in the peripheral groove 514 can be in a circular or an elliptical shape.

As shown in FIG. 7A, the first sealing component 700 is in a circular shape and has an outer diameter d8 and an inner diameter d9. In certain embodiment, the circular shaped first sealing component 700 can show an elliptical shape after installed into an elliptical shaped peripheral groove 514.

In certain embodiments, the outer diameter d8 of the first sealing component 700 is in the range of about 0.2-20 inch. In certain embodiments, the outer diameter d8 is in the range of about 0.4-10 inch. In certain embodiments, the outer diameter d8 is in the range of about 1.0-4.0 inch. In certain embodiments, the outer diameter d8 is about 2.01 inch.

In certain embodiments, the inner diameter d9 of the first sealing component 700 is in the range of about 0.18-18 inch. In certain embodiments, the inner diameter d9 is in the range of about 0.36-9 inch. In certain embodiments, the inner diameter d9 is in the range of about 0.9-3.6 inch. In certain embodiments, the inner diameter d9 is about 1.815±0.15 inch.

In certain embodiments, the thickness of the first sealing component 700 or a diameter of the first sealing component 700 (if the sectional view of the first sealing component 700 is a circle) is in the range of about 0.10-0.95 inch. In certain embodiments, the thickness of the first sealing component 700 is in the range of about 0.019-0.48 inch. In certain embodiments, the thickness of the first sealing component 700 is in the range of about 0.048-0.19 inch. In certain embodiments, the thickness of the first sealing component 700 is about 0.095±0.0.003 inch.

In certain embodiments, the first sealing component 700 is an O-ring. In certain embodiments, the first sealing component 700 is made of silicone rubber. In certain embodiments, the silicone rubber has 25-40 durometer (shore A).

Figure 8A:
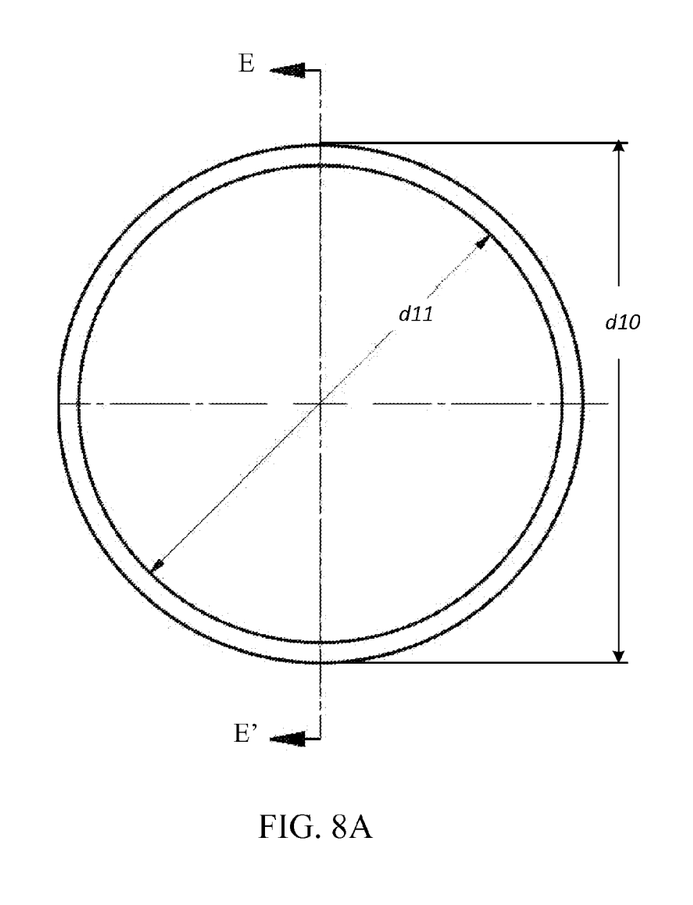
FIG. 8A is a top view of a second sealing component of the feed horn according to one embodiment of the present invention.
Figure 8B:
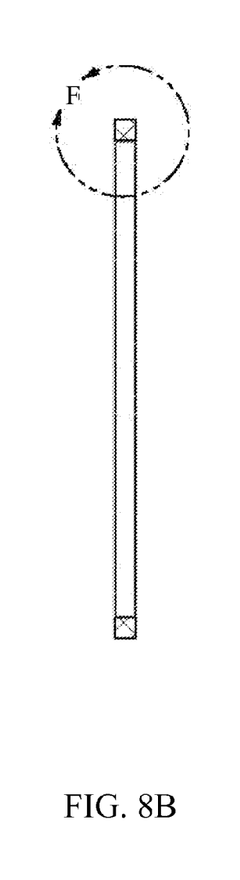
FIG. 8B is a side view of the second sealing component of FIG. 8A along E-E'.
Figure 8C:
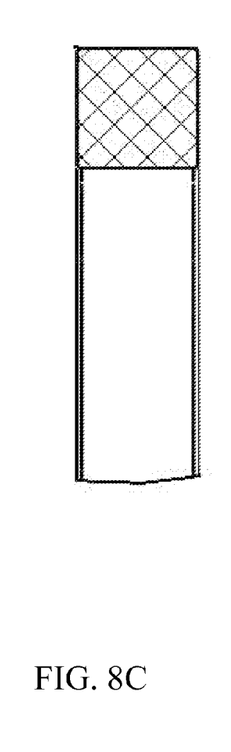
FIG. 8C is an enlarged view of part F of FIG. 8B.

As shown in FIGS. 8A-8C, the second sealing component 800 is a ring shaped structure matching the peripheral groove 514 and is disposed over and along the first sealing component 700. In certain embodiments, the peripheral groove 514 can be in a circular or an elliptical shape. In certain embodiments, the second sealing component 800 disposed in the peripheral groove 514 also presents as a circle or an ellipse.

As shown in FIG. 8A, the second sealing component 800 has an outer diameter d10 and an inner diameter d11.

In certain embodiments, the outer diameter d10 of the second sealing component 800 is in the range of about 0.2-20 inch. In certain embodiments, the outer diameter d10 is in the range of about 0.4-10 inch. In certain embodiments, the outer diameter d10 is in the range of about 0.99-3.96 inch. In certain embodiments, the outer diameter d10 is about 1.98±0.005 inch.

In certain embodiments, the inner diameter d11 of the second sealing component 800 is in the range of about 0.18-18.2 inch. In certain embodiments, the inner diameter d11 is in the range of about 0.36-9.1 inch. In certain embodiments, the inner diameter d11 is in the range of about 0.91-3.64 inch. In certain embodiments, the inner diameter d11 is about 1.82±0.005 inch.

In certain embodiments, the sectional view along the thickness direction of the second sealing component 800 is a square. The side length of the square is in the range of about 0.008-0.8 inch. In certain embodiments, the side length of the square of the second sealing component 800 is in the range of about 0.016-0.4 inch. In certain embodiments, the side length of the square of the second sealing component 800 is in the range of about 0.04-0.16 inch. In certain embodiments, the side length of the second sealing component 800 is about 0.080±0.005 inch.

In certain embodiments, the second sealing component 800 is made of plastic. In one embodiment, the second sealing component 800 is made of UV stable polypropylene. In certain embodiments, the second sealing component 800 formed by about 89% of polypropylene (PP), about 1% UV absorber, and about 10% ethylene vinyl acetate (EVA). In certain embodiments, the UV absorber is benziohenone or benzotriazole.

In one embodiment, the second sealing component 800 has an upper surface, a lower surface, an inner surface, and an outer surface. The lower surface of the second sealing component 800 is a concaved surface, and the upper surface of the second sealing component 800 is a convex surface. When installed, the concaved lower surface matches the first sealing component 700 so that the sealing effect is improved. The convex upper surface of the second sealing component 800 is easily pressed by the pneumatic tool.

In certain embodiment, the inner diameter d11 of the second sealing component 800 is greater than the inner diameter d9 of the first sealing component 700, and the outer diameter d10 of the second sealing component 800 is smaller than the outer diameter d8 of the first sealing component 700.

EXAMPLE 1

In one example, referring to FIGS. 3-8C, a feed horn assembly includes a horn body 500, a sealing film 600, a first sealing component 700, and a second sealing component 800.

The horn body 500 includes a first end 510 and a second end 520 opposite to the first end 510. The first end 510 of the horn body 500 includes an inner peripheral portion 512 and an outer peripheral portion 516, and a peripheral groove 514 is defined by the inner peripheral portion 512 and the outer peripheral portion 516. The first end 510, the inner peripheral portion 512, the peripheral groove 514 and the outer peripheral portion 516 are in a shape of cylinder and a sectional view from the top of the horn body 500 is in a shape of circle. The first end 510 of the horn body 500 has a diameter d1 of 2.100±0.002 inch. The outer peripheral portion 516 has an outer side diameter (that is, d1) and an inner side diameter d2 of 1.979±0.002 inch. The groove 514 is defined by an outer side diameter (that is, d2) and an inner side diameter d3 of 1.781±0.002 inch. The inner peripheral portion 514 has an outer side diameter (that is, d3) and an inner side diameter d4 of 1.618±0.002 inch.

The outer peripheral portion 516 has a peripheral chamfer portion 517, and the peripheral chamfer portion 517 is formed by crimping. The peripheral chamfer portion 517 urges against the sealing structure, such that a sealed condition is formed between the film 600 and the inner peripheral portion 512. The length of the peripheral chamfer 517 is about 0.05 inch, and the peripheral chamfer 517 forms an acute angle of about 45° with the inner surface of the outer peripheral portion 516.

The film 600 covers an opening of the first end 510 of the tubular horn body 500. The film 600 includes a central portion 602, a peripheral bending portion 604 bends downwards from the circumference of the central portion 602, and a periphery portion 606 bends upwards from the circumference of the peripheral bending portion 604. When being covered on the horn body, the central portion 602 covers the opening of the first end 510 of the horn body 500, the peripheral bending portion 604 is placed immediately surrounding the outer side surface of the inner peripheral portion 512 and located in the peripheral groove 514, and the peripheral portion 606 is placed along the bottom surface of the peripheral grove 514.

The central portion 602, the peripheral bending portion 604, and the periphery portion 606 have the same thickness of 0.020±0.005 inch. The central portion 602, the peripheral bending portion 604, and the periphery portion 606 are in the shape of a circle when view from the top. The film 600 has a circular shape and the diameter of the circle d5 is 1.945±0.005 inch. The central portion 602 has a circular shape and the diameter of the circle d6 is 1.785+(0.000-0.005) inch.

Optionally, the central portion 602 may include a depressed portion 601 in the center of the central portion 602. The depressed portion 601 has a circular shape and the diameter of the circle d7 is 1.705±0.005 inch. The thickness of the depressed portion 601 is 0.01 (−0.001/+0.003) inch.

In this example 1, the peripheral bending portion 604 extends downward from the central portion 602. Thus, the outer diameter of the bending portion 604 is the same as the diameter of the central portion 602. The bending portion 604 further has a depth or length l1 0.19±0.005 inch in a direction substantially perpendicular to the surface of the central portion 602. The peripheral bending portion 604 extends upwards to form from the peripheral portion 606. The diameter of the peripheral portion 606 is the same as the diameter of the film 600. The peripheral portion 606 further has a length l2 of 0.08±0.005 inch in a direction substantially parallel with the surface of the central portion 602. The film 600 includes 89% PP, 1% UV absorber and 10% EVA.

The sealing structure, including the first sealing component 700 and the second sealing component 800, is disposed in the peripheral groove 514. The first sealing component 700 urges against the outer surface of the peripheral groove 514, the peripheral bending portion 604, and the peripheral portion 606. A second sealing component 800 urges against the outer surface of the peripheral groove 514, the peripheral portion 606, and the first sealing element 700.

The first sealing component 700 is an O-ring made of silicone rubber, and the silicone rubber has 25-40 durometer (shore A). The O-ring 700 has an outer diameter d8 of about 2.01 inch and an inner diameter d9 of 1.815±0.15 inch, and a thickness of 0.095±0.0.003 inch.

The second sealing component 800 is plastic ring with a square shaped sectional view. The second sealing component 800 has an outer diameter d10 of 1.98±0.005 inch, an inner diameter d11 of 1.82±0.005 inch, and the side length of the square is 0.080±0.005 inch.

Figure 9:
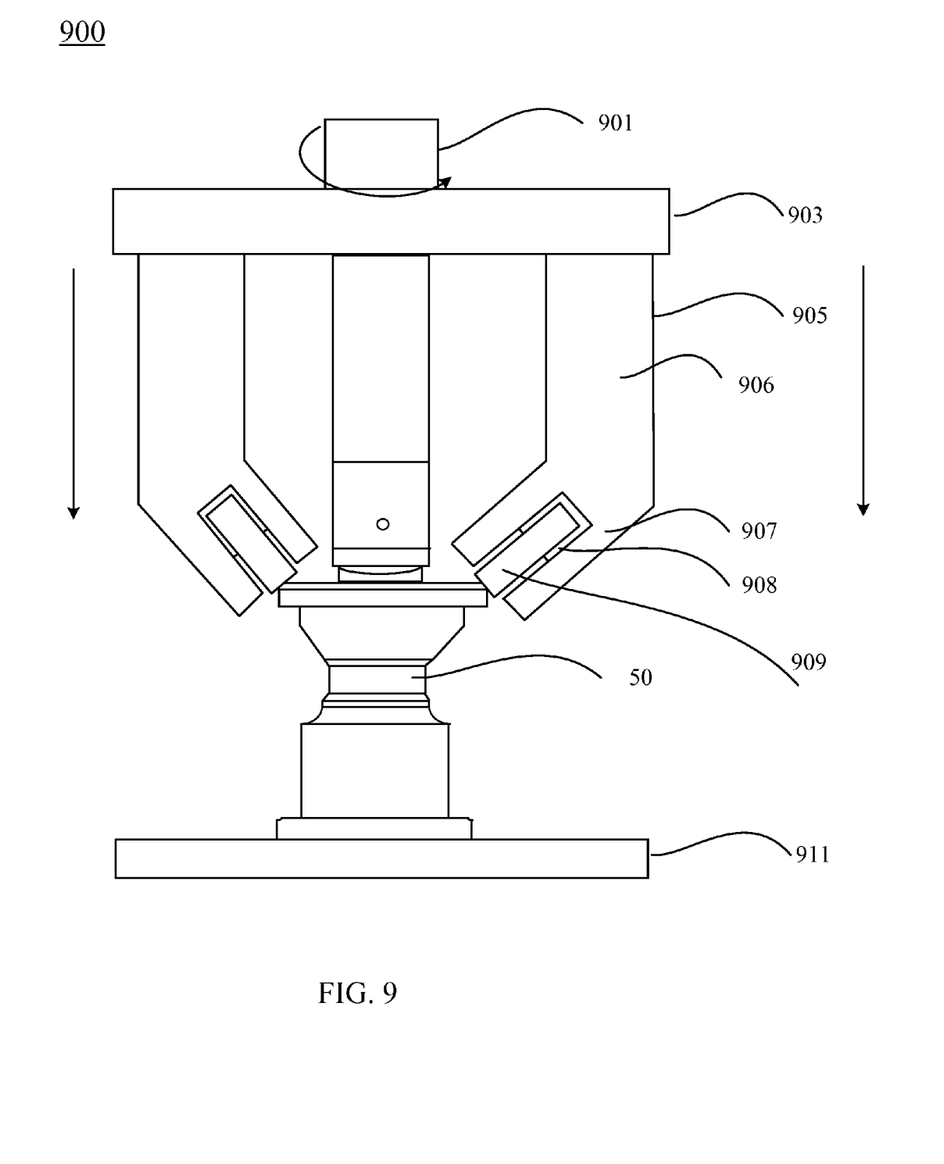
FIG. 9 is a schematic front view of a crimping assembly according to one embodiment of the present invention.

A crimping assembly 900 is provided. In certain embodiments, as shown in FIG. 9, the crimping assembly includes a central shaft 901, a shaft plate 903, three arms 905 each with a wheel 909, and a table 911. Alternatively, the crimping assembly can have 2, 4, 5, 6 or more arms 905.

The horn body 500 with the film 600, the first sealing component 700, and the second sealing component 800 installed, is fixed on the table 911.

Each of the arms 905 has a straight arm portion 906 and a bending arm portion 907. When configured for performing the crimping process, the shaft plate 903 and the table 911 are substantially parallel to the ground or working surface, and the straight arm portion 906 is perpendicular to the shaft plate 903 and the table 911.

One end of the straight arm portion 906 is fixed to the shaft plate 903, and the other end of the straight arm portion 906 bends and extends to form the bending arm portion 907. The bending arm portion 907 forms an obtuse angle with the straight arm portion 906. In certain embodiments, the obtuse angle is in the range of 100-160°. In certain embodiments, the obtuse angle is in the range of 110-130°. In certain embodiments, the obtuse angle is about 120°.

One end of the bending arm portion 907 extends from the straight bending arm 906, and the other end of the bending portion 907 has a gap 908. The wheel 909 is disposed in the gap 908, and rotatably fixed to the bending arm portion 907. In one embodiment, the wheel 909 has a central hole, and a shaft is screwed on the bending arm portion 907. The screwed shaft passes through the central hole of the wheel 909, and the wheel 909 can rotates around the screwed shaft.

In certain embodiments, the three arms 905 are evenly distributed. When viewed from the top of the shaft plate 903, along the direction of the axis of the central shaft 901, each two neighboring arms 905 forms an angle of 120° in a reflection surface parallel to the shaft plate 903 and perpendicular to the straight arm portion 906.

Figure 10:
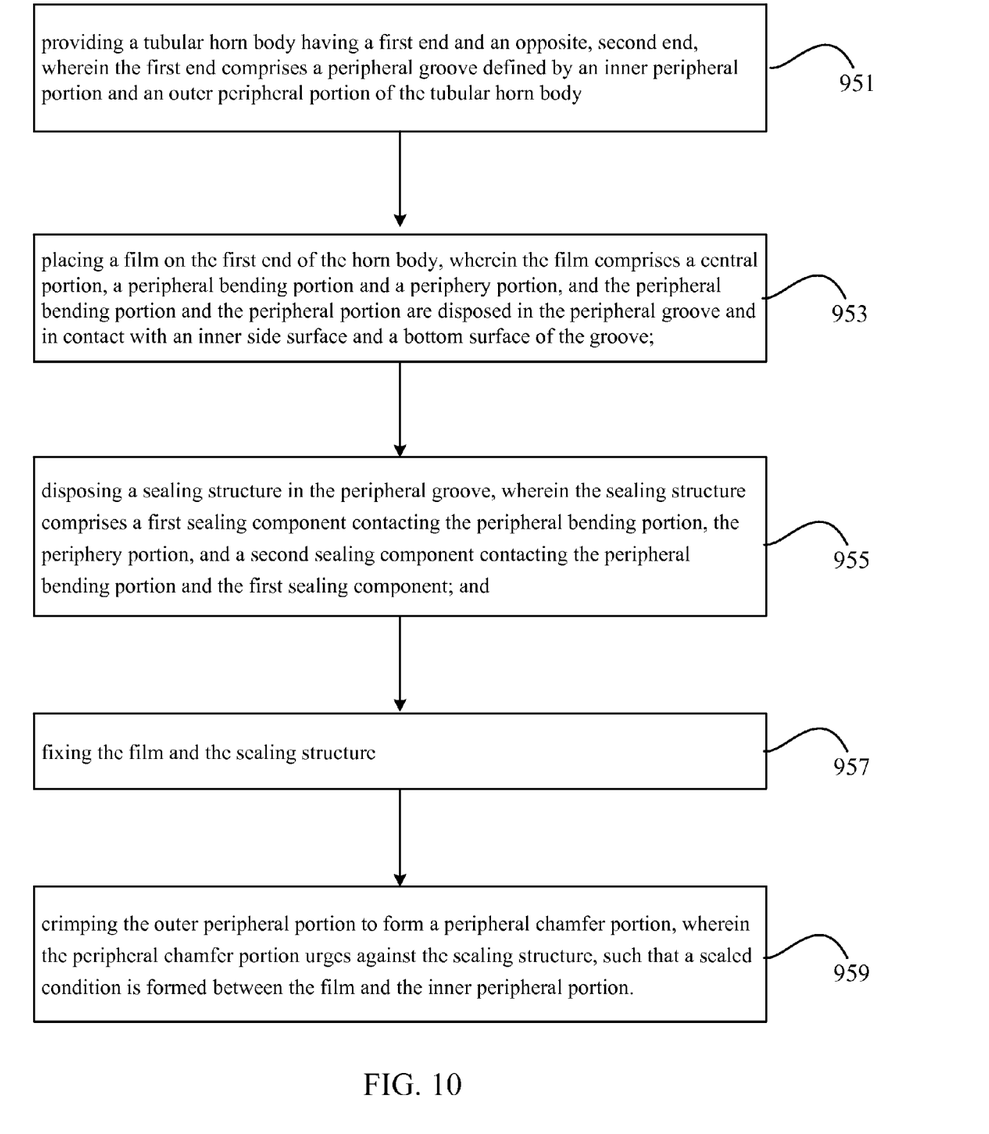
FIG. 10 is a method of sealing a feed horn according to one embodiment of the present invention.

In one aspect, the present invention is directed to a method 950 of producing a feed horn assembly 50.

In operation 951, a tubular horn body 500 is provided. The tubular horn body 100 has a first end 510 and an opposite, second end 550. The first end 510 includes an inner peripheral portion 512 and an outer peripheral portion 516, and a peripheral groove 514 is defined by the inner peripheral portion 512 and the outer peripheral portion 516.

In operation 953, a film 600 is covered on the first end 110 of the horn body 500. A convex surface of a central portion 602 faces upward, and a periphery bending portion 604 and a peripheral portion 606 of the film 600 are disposed inside the peripheral groove 514 and in contact with inner side surfaces (i.e., the outer side surface of the inner peripheral portion 512 and the inner side surface of the outer peripheral portion 516) and a bottom surface of the groove 114, respectively.

In operation 955, a sealing structure is disposed in the in the peripheral groove 514. The sealing structure includes a first sealing component 700 and a second sealing component 800. The first sealing component 700 is in contact with the peripheral portion 606, and may in contact with the bending portion 604 and the inner surface of the outer peripheral portion 516. The second sealing component 800 is in contact with the first sealing element 700, and may in contact with the bending portion 604 and the inner surface of the outer peripheral portion 516.

In operation 957, the film 600, the first sealing component 700, and the second sealing component 800 are fixed onto the first end 510 of the horn body 500. In certain embodiments, the fixation is performed by a pneumatic tool. In certain embodiments, the first sealing component 700 is put in the peripheral groove 514 over the film 600, and pressed evenly by a pneumatic tool, then the second sealing component 800 is put on the first sealing component 700, and pressed by the pneumatic tool. Alternatively, in certain embodiments, the first sealing component 700 and the second sealing component 800 are installed, and pressed, for example, by the pneumatic tool. By the pressing of the pneumatic tool, the contact of the first sealing component 700, the second sealing component 800, the film 600, and the groove 514 are compact and tight. In certain embodiment, the film 600 is further pressed, for example, by a pneumatic tool.

In one embodiment, the second sealing component 800 has an upper surface, n lower surface, an inner surface, and an outer surface. The lower surface of the second sealing component 800 is a concaved surface, and the upper surface of the second sealing component 800 is a convex surface. When installed, the concaved lower surface matches the first sealing component 700 so that the sealing effect is improved. The convex upper surface of the second sealing component 800 is easily pressed by the pneumatic tool.

In operation 959, the outer peripheral portion 516 is crimped to form a peripheral chamfer portion 517. In certain embodiments, the rotation speed of the arms is in a range of 50-1000 revolutions per minute (rpm). In certain embodiments, the rotation speed of the arms is in a range of 150-600 rpm. In certain embodiments, the rotation speed of the arms is in a range of 250-350 rpm. In certain embodiments, the rotation speed of the arms is about 300 rpm. In certain embodiments, the downward force exerted on the shaft plate or on the arms is in a range of 1-100 kilogram (kg). In certain embodiments, the downward force exerted on the shaft plate or on the arms is in a range of 2-50 kilogram. In certain embodiments, the downward force exerted on the shaft plate or on the arms is in a range of 5-20 kilogram. In certain embodiments, the downward force exerted on the shaft plate or on the arms is about 10 kg.

The chamfer portion 517 urges against the sealing structure, such that a sealed condition is formed between the film 600 and the inner peripheral portion 512. In certain embodiments, due to the crimping treatment, the inner side surface of the peripheral groove 514 is slightly slanted towards the inside of the peripheral groove 514. In certain embodiments, during the crimping process, the film 600 may protrudes from the first end 510 of the horn body, and under this situation, a pressing by the pneumatic tool is performed to flat the film 600, and then the crimping process is continued until completion.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the disclosure pertains without departing from its spirit and scope. Accordingly, the scope of the disclosure is defined by the appended claims as well as the disclosure including drawings.

What is claimed is:

1. A feed horn assembly, comprising:
   a tubular horn body having a first end and an opposite, second end, wherein the first end comprises a peripheral groove defined by an inner peripheral portion and an outer peripheral portion;
   a film covering the first end of the tubular horn body, wherein a peripheral bending portion and a periphery portion of the film are disposed inside the groove and in contact with an inner side surface and a bottom surface of the peripheral groove respectively;
   a sealing structure disposed in the groove, wherein the sealing structure comprises a first sealing component urging against the peripheral bending portion and the periphery portion of the film, and a second sealing component urging against the peripheral bending portion and the first sealing component,
   wherein the outer peripheral portion has a peripheral chamfer portion formed by crimping, and the peripheral chamfer portion urges against the sealing structure, such that a sealed condition is formed between the film and the inner peripheral wall.

2. The feed horn assembly of claim 1, wherein the tubular horn body is made of metal, plastic, or glass fiber.

3. The feed horn assembly of claim 1, wherein an opening of the first end of the tubular horn body is in a shape of circle or ellipse.

4. The feed horn assembly of claim 1, wherein the film is formed by a plastic material, an anti-UV material, and a hydrophobic material.

5. The feed horn assembly of claim 1, wherein the film is formed by about 89% of polypropylene, about 1% anti UV material, and about 10% ethylene vinyl acetate.

6. The feed horn assembly of claim 1, wherein the first sealing component is an O-ring.

7. The feed horn assembly of claim 1, wherein the second sealing component is a plastic ring.

8. The feed horn assembly of claim 1, wherein each of the first sealing component and the second sealing component has a size and shape substantially consistent with a size and shape of the peripheral groove, such that the first sealing component and the second sealing component can be installed in the peripheral groove.

9. The feed horn assembly of claim 1, wherein each of the peripheral groove, the first sealing component and the second sealing component has a diameter of about 1.6-2.0 inch.

10. The feed horn assembly of claim 1, wherein the first sealing component is an O-ring, the second sealing component is a plastic ring, an inner diameter of the second sealing component is greater than an inner diameter of the first sealing component, and an outer diameter of the second sealing component is smaller than an outer diameter of the first sealing component.

11. A method of producing a feed horn assembly, comprising:
- providing a tubular horn body having a first end and an opposite, second end, wherein the first end comprises a peripheral groove defined by an inner peripheral portion and an outer peripheral portion of the tubular horn body;
- placing a film on the first end of the horn body, wherein the film comprises a central portion, a peripheral bending portion and a periphery portion, and the peripheral bending portion and the peripheral portion are disposed in the peripheral groove and in contact with an inner side surface and a bottom surface of the groove;
- disposing a sealing structure in the peripheral groove, wherein the sealing structure comprises a first sealing component contacting the peripheral bending portion, the periphery portion, and a second sealing component contacting the peripheral bending portion and the first sealing component;
- fixing the film and the sealing structure; and
- crimping the outer peripheral portion to form a peripheral chamfer portion, wherein the peripheral chamfer portion urges against the sealing structure, such that a sealed condition is formed between the film and the inner peripheral portion.

12. The method of claim 11, wherein the crimping is performed by a crimping assembly, and the crimping assembly comprises:
- a shaft and a shaft plate connected with the shaft;
- three arms connected with the shaft plate, each arm having a straight portion, a bending portion extending downwards from the straight portion, and a gap formed in an end of the bending portion;
- three wheels, each wheel is installed in one of the three gaps; and
- a table for fixing the feed horn assembly thereon,
- wherein the three wheels are configured to crimping the outer peripheral portion of the horn body, such that the sealed condition is formed between the film and the inner peripheral portion.

13. The method of claim 11, wherein a rotation speed of the shaft is about 300 revolutions per minute.

14. The method of claim 11, wherein a pressing force of the crimping assembly to the feed horn assembly is about 10 kilograms.

15. The method of claim 11, wherein the peripheral chamfer portion is formed at top of outer surface of the outer peripheral portion.

16. The method of claim 11, wherein the film is formed by a plastic material, an anti-UV material, and a hydrophobic material.

17. The method of claim 11, wherein the film is formed by about 89% of polypropylene, about 1% anti UV material, and about 10% ethylene vinyl acetate.

18. The method of claim 11, wherein each of the first sealing component and the second sealing component has a size and shape substantially consistent with a size and shape of the peripheral groove, such that the first sealing component and the second sealing component can be installed in the peripheral groove.

19. The method of claim 11, wherein each of the peripheral groove, the first sealing component and the second sealing component has a diameter of about 1.6-2.0 inch.

20. The method of claim 11, wherein the first sealing component is an O-ring, the second sealing component is a plastic ring, an inner diameter of the second sealing component is greater than an inner diameter of the first sealing component, and an outer diameter of the second sealing component is smaller than an outer diameter of the first sealing component.

* * * * *